(12) United States Patent
Gibson et al.

(10) Patent No.: US 7,791,254 B1
(45) Date of Patent: Sep. 7, 2010

(54) HYBRID ULTRASOUND TRANSDUCER

(76) Inventors: William Gordon Gibson, 10908 126th Street NW., Edmonton, Alberta (CA) T5M 0P3; Curtis Barry Figley, 1977 Tomlinson Square NW., Edmonton, Alberta (CA) T6R 2R6; Darin Wayne Hunt, 9474 77 Street NW., Edmonton, Alberta (CA) T6C 2M6

( * ) Notice: Subject to any disclaimer, the term of this patent is extended or adjusted under 35 U.S.C. 154(b) by 212 days.

(21) Appl. No.: 11/984,859

(22) Filed: Nov. 23, 2007

Related U.S. Application Data (60) Provisional application No. 60/861,011, filed on Nov. 27, 2006.

(51) Int. Cl.
*H01L 41/08* (2006.01)
(52) U.S. Cl. .................................... 310/336
(58) Field of Classification Search ............... 310/322, 310/327, 336, 334, 323.21, 318, 319, 323.06, 310/314, 317; 367/140, 157; 73/587, 633, 73/632; *H01L 41/08, 41/09*
See application file for complete search history.

(56) References Cited

U.S. PATENT DOCUMENTS

| | | | | |
|---|---|---|---|---|
| 5,345,427 A | * | 9/1994 | Ishida et al. | 367/140 |
| 6,370,086 B2 | * | 4/2002 | Li | 310/334 |
| 6,540,677 B1 | | 4/2003 | Angelsen et al. | |
| 2007/0016069 A1 | * | 1/2007 | Grunwald et al. | 310/311 |
| 2008/0294054 A1 | * | 11/2008 | Asagiri et al. | 600/459 |

OTHER PUBLICATIONS

Analog Devices Linear Design Seminar, 1995, Transducer Interfacing.
ARRL Handbook, 1986, chapter 19.
NDTnet, May 1998, vol. 3, No. 5, L. Sullivan, et al, "The Hardware Concept of a new Digital Ultrasonic NDE System".

* cited by examiner

*Primary Examiner*—Thomas M. Dougherty
*Assistant Examiner*—Karen B Addison
(74) *Attorney, Agent, or Firm*—Paul R. Martin (57) ABSTRACT

In a nondestructive testing system, a preamplifier is connected to a piezoelectric element and is tuned to optimize the amplitude of a signal input to the piezoelectric element and the shape of a response signal. A receiver amplifier couples the signal received from the piezoelectric element to an ultrasound system.

22 Claims, 6 Drawing Sheets

HYBRID ULTRASOUND TRANSDUCER

CROSS REFERENCE TO RELATED APPLICATION

The present application claims the benefit of the filing date of provisional patent application Ser. No. 60/861,011, filed on Nov. 27, 2006, the disclosure of which is incorporated herein by reference.

TECHNICAL FIELD OF THE INVENTION

The present invention relates to the general art of measuring and testing, and to the particular field of nondestructive measuring and testing.

BACKGROUND OF THE INVENTION

Transducers are defined as devices that convert energy or a physical quantity from one form to another. The purpose of a transducer is to generate or detect some signal phenomena. There are basically two wide areas into which transducers are categorized: active and passive. An active transducer generates a signal, typically a voltage or current, as a result of some form of energy or force change such as when a thermocouple generates an electrical signal when heated which is a function of the amount of heat applied; and a passive transducer which changes its properties when exposed to energy. A passive transducer has an element which, under some force, responds by changing its physical properties or behavior. Transduction employs a transfer process that senses or communicates energy or information.

Non-destructive testing (NDT) often uses special transducers to interrogate the internal structure and features of materials that can not be directly observed by ordinary means. As used herein, the term "non-destructive testing" means any testing method which does not involve damaging or destroying the test sample. In many instances the structures or features embedded in the materials are undesirable and are considered flaws or damage. In other instances the internal structures and features are an expected, allowable or necessary component of the material. In either case, obtaining accurate information about the nature and character of these internal structures and features is a fundamental need during the inspection, qualification and diagnosis of these materials. One common transducer in NDT applications is the ultrasound transducer (UT).

In the case of a UT, sound energy is converted to electrical energy or electrical energy is converted to sound energy. In many cases this energy conversion is done through the piezoelectric effect, where an electrical field or potential in a piezoelectric material induces a mechanical stress generating an acoustic field, or conversely, an acoustic field impinging on the piezoelectric material induces an electric field or potential. These piezoelectric materials normally have a complex electrical impedance which requires special methods to integrate them into useful transducers.

Ultrasound is defined as sound whose frequency is above the threshold of hearing (that is, greater than 20 kHz). For practical purposes, signals greater than 100 kHz are typically used. Frequency, along with excitation time width, defines the spatial resolution of the interrogating sound field. A short, high frequency pulse will enable small anomalies and defects in material to be detected. However, with an increase in frequency comes an increase in the attenuation, scattering and absorption of the sound energy. This limits the effective depth that can be probed without too great a loss in signal energy. Consequently, there is an optimal frequency range that trades resolution with received signal response. For ultrasound NDT, a frequency range between 2 and 20 MHz is optimal, with the lower range being most common.

Figure 1:
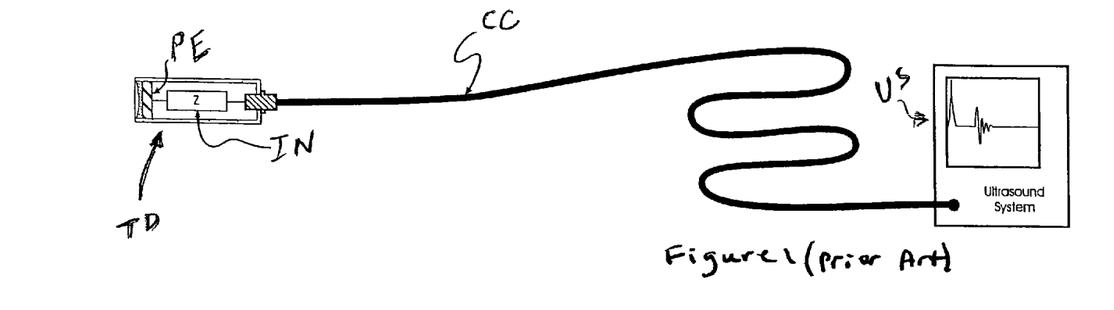
FIG. 1 shows a conceptual block diagram of a prior art NDT ultrasound system configured with a long coaxial cable and a traditional single element ultrasound transducer.

A conventional NDT system configuration is shown in FIG. 1. In this figure an ultrasound system US is connected to an ultrasound transducer (UT) TD via a long coaxial cable CC. The ultrasound system produces a high voltage excitation signal which propagates down the coaxial cable, is applied to a piezoelectric element PE (which includes the piezoelectric material and optional tuning components, indicated as impedance matching and tuning network IN) and generates an acoustic signal from the front of the UT. Received signals are sensed by the UT and sent back down the coaxial cable to the ultrasound system for analysis.

Due to the relative inefficiency of piezoelectric materials used in ultrasound transducers, large excitation signals are often needed to generate a sufficiently intense sound field. In NDT applications, UT excitation signals can be hundreds of volts but normally have a low average power, often less than a Watt. As a receiver, a UT produces extremely small signals, typically on the order of a factor of 1,000 to 1,000,000 down from the excitation signal. This corresponds to a range of input to output amplitudes of 60 to 120 dB.

The very nature of the transduction process involving physical structures tends to distort, delay and degrade the signal being transferred. Distortion of the signal can be caused by nonlinearities, hysteresis, resonances, and environmental effects. Any inadvertent energy storage in the process may cause time delays between the output signal and the event. A time delay is often mathematically modeled as a phase shift. The normal sensing and processing of signals also adds noise, which can degrade the information being transferred. A useful measure of the ability of a system to convey information from a transducer to a measurement or detection unit is the Signal-to-Noise Ratio (SNR). This parameter relates the signal, in whatever dimensions and units are appropriate, to the noise that is present and that would be detected simultaneously with the signal. High SNR values indicate that the signal stands out clearly against the background, whereas low SNR values indicate that the signal is being obscured by the noise. Averaging a number or signal segments in the time or frequency domain may reduce the masking effect of random noise and may improve the SNR.

Although it is possible to increase the intensity of the sound field by increasing the amplitude of the excitation and thus increase the received signal, for practical transducers there is always a physical limit to the amplitude or power that can be applied. Temporary or permanent performance degradation or even failure will be caused to the transducer if the excitation is increased beyond this level.

Additional receiver signal strength can be achieved by applying electronic gain or amplification. However, this approach is an ongoing challenge in ultrasound NDT applications since inappropriately placed amplification may simply increase the noise at the same rate as the signal, which will not produce an improvement in the SNR. Amplification can also introduce other distortion problems such as clipping, saturation effects, dispersion and transition time degradation, which will mask the underlying signal's true character.

The environments where traditional ultrasound NDT techniques are used are often industrial in nature. In these situations there is a large amount of electrical interference from welding equipment, radio communication systems, high power electronics, large motor loads, electrical switching gear or other severe electromagnetic interference (EMI) generators. This noise is often in the same frequency bands as the signal of interest and can enter into the signal path to reduce the SNR. As is known to those skilled in the art, if noise is combined with a signal, it becomes more complex and difficult to extract the original signal. It is advantageous then to increase and maintain the signal strength as soon as possible in the signal path to reduce the relative effects of noise that might be introduced later.

As well, NDT UT's are often used on the distal end of relatively long transmission cables. Transmission cables, or lines, suffer from impedance matching issues, signal attenuation and noise pickup problems.

As used in this disclosure, the term "transmission lines" refer to electrical cables or interconnections whose length is more than a significant fraction (for example, more than 5%-10%) of the characteristic wavelengths of the signal-of-interest being conveyed on the cable or interconnection. As used herein in relation to the length of a signal conductor, the term "short" is taken to mean 5 to 10% of the characteristic wavelength of a signal on the conductor and the term "trivial" is taken to mean less than 1% of the characteristic wavelength whereby a conductor that is short or trivial can essentially be ignored as far as its effect on the signal because its length is short enough to not affect the signal. The term "characteristic wavelengths" refers to the range of wavelengths corresponding to the band of frequencies of interest in the conveyed signal. Non-trivial transmission line impedance matching effects may or may not exist at each of these wavelengths as a result of the physical arrangement of the equipment and the particular construction of the interconnecting conductors.

Other common ultrasound testing configurations include arrangements where two or more approximately equivalent piezoelectric assemblies are used, where a combination of one or more elements are used to produce the acoustic signal and a combination of one or more elements acts as a receiver. This configuration, although more complex in layout, operates on essentially the same transmit-receive basis as the single piezoelectric element configuration. The disclosed invention is equally applicable to these multi piezoelectric element configurations.

The piezoelectric element has a complex impedance behavior. Historically, passive matching networks have been used to prevent impedance mismatch reflections from the piezoelectric element when it is coupled to a transmission line. Reflections can create undesirable signal distortion and introduce excitation artifacts.

Traditionally, the piezoelectric element matching network is formed from a combination of inductive, capacitive and possibly resistive elements that trade signal amplitude for reduced reflection effects. The matching circuitry ensures that the high frequency signal components traveling to and from the transducer are well behaved in the cable, but the matching circuitry does not improve either the power received by the transducer or the power received by the ultrasound system from the transducer.

In addition to the impedance matching network, it is often desired to have a response tuning network that is used to optimize the sensitivity, resonant frequency and bandwidth of the piezoelectric element for a given configuration and application. Often it is not possible to optimize the response of the piezoelectric element at the same time as matching the impedance, as these two functions occur within the same portion of the circuit and are often at odds with each other. There is often a compromise made between matching and tuning that results in a less than ideal response.

When acting as a receiver, the piezoelectric element behaves as an impedance limited voltage source. To recover the largest signal from such a voltage source, it should be coupled to a high input impedance voltage sensing circuit to limit loading effects. In many cases, these circuit requirements and characteristics many not be synonymous with those of the matching circuit for transmission cable matching, so less than ideal received signal transfer occurs when the circuit is only optimized for cable matching.

Signal attenuation can be compensated to some extent by the appropriate addition of gain elements configured and located to prevent undue signal distortion.

Reducing radiated and conducted susceptibility can minimize noise pickup. Antenna effects such as inductive signal path loops and capacitive coupling into circuits may be reduced by proper layout. Circuits may be isolated to break up ground loops and differential signaling techniques can inhibit conducted noise.

High noise environments, long interconnections, lossy matching networks and low signal levels generally combine to degrade the SNR and confound the detection of small, deep or poorly defined structures or features in the material under interrogation.

Therefore, there is a need for a device that can improve the coupling of the UT piezoelectric element to the signal transmission line to preserve the original signal amplitude.

There is also a need to generally increase the signal amplitude with high fidelity early on in the signal path before noise is introduced.

There is also a need to reduce noise coupling or coupling effects.

OBJECTS OF THE INVENTION

It is an objective of this invention is to achieve all of these goals while reducing or avoiding the undesirable effects identified herein.

It is an object of this invention to increase the received signal strength without proportionally increasing the noise, thus enhancing the signal to noise ratio.

It is an object of this invention to simultaneously improve amplitude and quality of the delivered excitation signal to the piezoelectric element while improving the coupling of the received signal from the piezoelectric element into the receiving circuits.

It is a further object of this invention to position and house the distal end circuitry in an enclosure with similar geometry and dimensions to traditional NDT transducers.

It is yet a further object of this invention to be "drop in" compatible with conventional ultrasound systems such that the invention can easily replace existing conventional transducers without requiring ultrasound system modifications.

It is another object of the invention to reduce the effects of spurious noise that is introduced into the received signal as it is transmitted back to the ultrasound system.

SUMMARY OF THE INVENTION

These, and other, objects, along with the above-discussed objective of increasing strength of a signal received from a piezoelectric element without proportionally increasing the noise are solved by a system in which a preamplifier is connected to the piezoelectric element and is tuned to optimize the input signal amplitude and response shape. The problem of simultaneously improving amplitude and quality of a delivered excitation signal to a piezoelectric element while improving the coupling of the received signal from the piezoelectric element into receiving circuitry is solved by a including a receiver amplifier which couples the received signal to an ultrasound system.

The system embodying the principles of the present invention intimately integrates a preamplifier, receiver and steering and protection circuitry into the NDT transducer design. The system embodying the principles of the present invention incorporates preamplifiers at the distal ends of the transducers as well as, in some forms, has an NDT system that utilizes differential signaling techniques on the received signal path.

Figure 2:
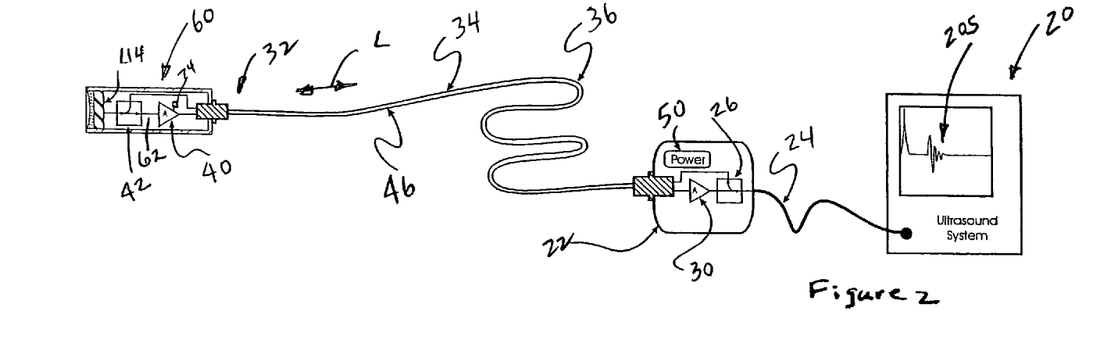
FIG. 2 shows a schematic in which a system embodying the principles of the present invention is connected in place of the ultrasound transducer and long coaxial cable.

More specifically, the system embodying the principles of the present invention is broadly illustrated in FIG. 2. Transmit excitation is carried from ultrasound system 20 to proximal receiver 22 through transmission line 24. A steering circuit 26 in the receiver routes the excitation past receiver amplifier 30 and to distal end 32 of the assembly through another transmission line 34 which is part of multi conductor cable bundle 36. At the distal end, the excitation is routed around preamplifier 40 by steering circuitry 42. Although there may be tuning components associated with the piezoelectric element, no dedicated impedance matching circuitry is used in the preamplifier input path shown in FIG. 2. However, the high voltage excitation transmit signal is terminated by the steering circuitry 42 in combination with the piezoelectric material and tuning components (if used). The signal routing, or steering circuit 42 isolates the low amplitude received signals from excitation transmission line 34. The received signal from piezoelectric element 44 is sent to preamplifier 40 and then down another set of transmission line conductors 46 in the cable bundle to the receiver amplifier 30. The receiver amplifier may have a net gain greater than 1, may attenuate or invert the signal, may leave the signal unchanged (as with a buffer with a gain of 1) or alternately it may convert the signal to another useful form such as with a transimpedance stage (voltage-to-current conversion), a voltage-to-frequency conversion stage or a digital conversion stage. One particular case using a gain of 1 is to reduce the receiver amplifier to a simple conductor that passes the signal from the preamplifier through toward the ultrasound system. A power source 50 is used to supply power to the various elements of the overall system and is suitably connected to such elements as needed. No limitation on the invention is implied by the particular form or gain of the receiver amplifier shown here.

In summary, the assembly receives transmit signals from the ultrasound system and forwards the signals to the piezoelectric transducer where they are emitted as an acoustic signal into the material being interrogated. Received acoustic signals are converted to an electrical signal in the piezoelectric element 44, preamplified at 40 and sent back towards the ultrasound system end of the assembly through a transmission line system 46. These signals are then processed in the receiver and routed back to the signal line 24 connected to the ultrasound system, which processes the received signals and displays information as signal 20S.

Using the principles embodying the present invention achieves at least the following results:

separation of the problem of simultaneously having to satisfy the contradictory requirements of matching the maximum signal energy of the transmitted signal into the piezoelectric element and then collecting the largest possible return signal into the received signal path. Using a preamplifier right at the piezoelectric element in conjunction with the signal routing circuits effectively removes the preamplifier from the transmit energy coupling problem while at the same time eliminating most of the undesired loading of the received signal by the transmit line with the result of a bigger outgoing acoustic pulse from the transducer and a larger received signal gain;

a much higher effective round trip gain allows better detection of structures being investigated, better resolution and deeper penetration;

many options to convey the return signal are possible using the preamplifier since it can drive a variety of signal conductors that often have superior signal quality characteristics and are better at suppressing noise that can be picked up by, induced in or otherwise might couple into the long return lines often encountered in real-life settings;

better round trip gain and lower noise pick up combine to allow either better measurements for a given distal to proximal distance or conversely the same quality measurements on longer interconnections. Both have significant applications; and conversion of the return signal at the proximal end, back into traditional/conventional unbalanced analogue format allows backward compatibility with conventional ultrasound testing equipment.

Other systems, methods, features, and advantages of the invention will be, or will become, apparent to one with skill in the art upon examination of the following figures and detailed description. It is intended that all such additional systems, methods, features, and advantages be included within this description, be within the scope of the invention, and be protected by the following claims.

BRIEF DESCRIPTION OF THE DRAWINGS

The invention can be better understood with reference to the following drawings and description. The components in the figures are not necessarily to scale, emphasis instead being placed upon illustrating the principles of the invention. Moreover, in the figures, like referenced numerals designate corresponding parts throughout the different views.

It is intended that the following detailed descriptions be understood to be illustrations of the various preferred embodiments of the invention and not as a definition of the invention. This discussion, although written for the case of a single piezoelectric element can be easily extended to multi element configurations. Such multi element configurations are within the scope of this invention

DETAILED DESCRIPTION OF THE INVENTION

Other objects, features and advantages of the invention will become apparent from a consideration of the following detailed description and accompanying drawings A block diagram of this invention, introduced in place of portions of a traditional system, is shown in FIG. 2. As discussed above, a preamplifier 40 is incorporated into UT unit 60. Preamplifier 40 is connected to piezoelectric element 44 by minimal lengths of conductor, such as conductor 62. The length of conductor 62 is short in comparison to the characteristic wavelengths of the preamplifer output signals. The length of conductor 62 can also be trivial with respect to the characteristic wavelengths of the preamplifer output signals. With conductor 62 being short or trivial in length, the possibility of introducing significant noise into the signal-of-interest is reduced. Accordingly, the preamplifier inputs can be tuned to optimize the input signal amplitude and response shape without having to compromise based on transmission line matching concerns.

The preamplifier isolates the piezoelectric element from the low impedance of the return transmission lines. Differential signaling back to the ultrasound system minimizes the effects of EMI on the received signals. The two sides of the differential signal follow closely matched paths to minimize inductive loop areas. Furthermore, steering circuit 42 can include signal direction circuits which can be configured to substantially disconnect the excitation signal lines during the received signal period thereby allowing the maximum amount of received signal energy to be provided to the preamplifier. Furthermore, circuit 42 can be configured to allow impedance matching of the excitation pulse to the piezoelectric element independent of the impedance matching and frequency filtering components provided to couple received signals into the preamplifier. Circuit 42 can also be configured to substantially disconnect the excitation signal lines during the received signal period thereby allowing the maximum amount of received signal energy to be provided to the preamplifier. Signal routing circuitry 42 preferentially directs excitation energy from the ultrasound system to the piezoelectric sensor element, received signal energy from the piezoelectric sensor element to the preamplifier, and amplified signal energy from the receiving amplifier to the ultrasound system.

Although FIG. 2 presents the case where the interconnections numbered 24, 34, and 46 are transmission lines, any or all of these conductors could be short compared to the characteristic wavelengths of the signals of interest such that they are no longer transmission lines as defined previously. Accordingly, as will be understood, no limitation is placed on the invention by the description of these conductors as transmission lines.

In the case where the returning transmission line system 46 is a differential pair, common mode noise that is picked up on the cable run back to the receiver is suppressed by a differential amplifier that forms element 30. The received signal is then coupled onto the transmission line 24 and conveyed back to ultrasound system 20 for processing and display.

It is noted that power supply 50 can be housed in receiver unit 22, but could be located elsewhere if suitable. Various forms of electrical power for the preamplifier circuit can be supplied through the system from internal batteries or from an external power source. This power may be routed separately or may be coupled to differential cables 34 via DC pass-block circuitry. If the power is carried on the signal lines, the power may be extracted in a similar fashion by decoupling circuitry at the transducer end and used to operate transducer amplifier 40.

A trend in sensing and analysis involves using digital techniques. Digital signals permit the use of an output signal that contains information which is precise and which is in a form that is compatible with digital computers and recorders. There also exists the design option of providing means for converting the received signal at the UT to a representative digital, form immediately after the preamplifier stage. The digital representation can be conveyed via a suitable connection such as a transmission line or transmission line system to the proximal receiver end of the assembly where it can be reconstructed into an analog form for processing by a conventional ultrasound system. Suitable fidelity conversion and reconstruction can be performed using state of the art digital design such that the end-to-end performance is comparable or superior to analog transmission techniques. Digital transmission of the received signal allows for improvement in the noise rejection in some situations and therefore may prove superior to analog transmission in these cases. One of the inherent features of digital transmission is that as long as the underlying digital representation can be recovered, the original signal can be reconstructed without added distortion or errors introduced by cable losses. In the digital implementation, preamp 40 of FIG. 2 will provide both pre-amplification and analog-to-digital conversion. Correspondingly, preamplifier 30 will provide digital-to-analog conversion and range scaling. Other aspects and functions shown in FIG. 2 will behave substantially the same as in the analog case.

Figure 3A:
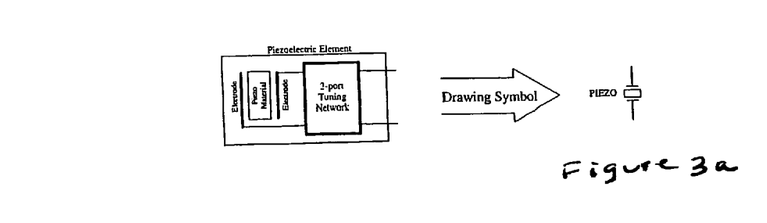
FIG. 3a shows a generalized piezoelectric element that includes a tuning network for response optimization. This figure also shows the "PIEZO" circuit symbol used in subsequent figures and its relation to the piezoelectric element.

Referring to FIG. 3a, the present invention allows for a response tuning network to be optionally included within the piezoelectric element. The response tuning network can be used to optimize the sensitivity, resonant frequency and bandwidth of the sensor for a given circuit configuration or desired application. The network may be as simple as direct wire connections to the electrodes on either side of the piezoelectric material or may consist of various arrangements of inductive, capacitive and resistive elements. Within the context of this disclosure, any reference to the "PIEZO" circuit element should be understood as optionally including a response tuning network. Therefore, no limitation of the invention based upon the presence of a particular tuning network configuration should be implied in any of the discussion or teaching of the present disclosure or claims.

Figure 3B:
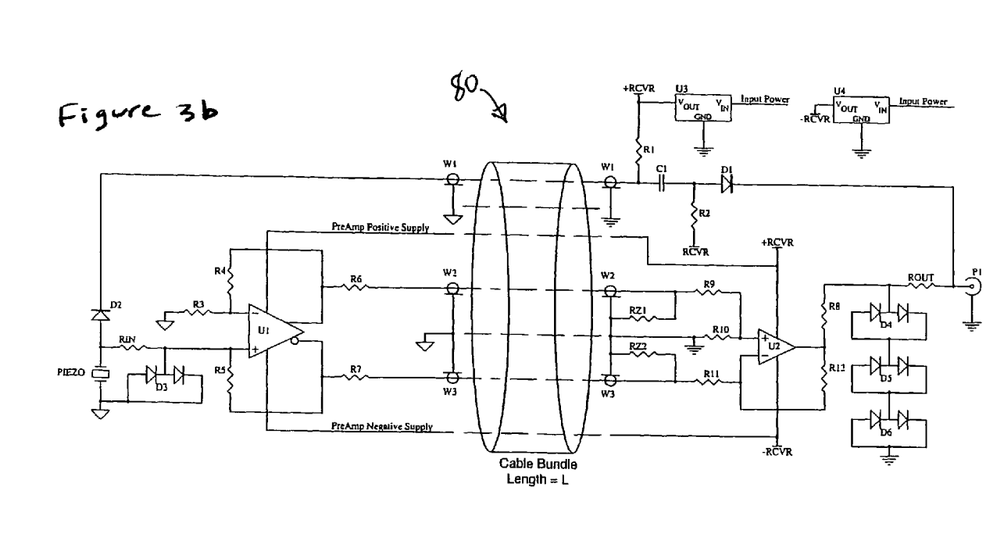
FIG. 3b shows one system embodying the principles of the present invention wherein the distal preamplifier and associated elements are connected by several transmission lines with power provided through dedicated conductors.

Referring to FIG. 3b, the principles of the present invention are broadly embodied in a system 80 for use in material testing. Negative polarity excitation signals are routed from connector P1, which is connected to an ultrasound system via a short transmission line. The excitation signals, generated by the ultrasound system, travel to the distal end of the assembly where the piezoelectric element converts the energy into an acoustic wave, radiating out of the assembly. After the excitation signal, returning acoustic reflections are converted into electrical signals by the piezoelectric element, although at a much lower amplitude than the original exciting signal. The received signals, once converted back to an electrical form, generally have a bipolar character. The received signals are manipulated and carried back to the proximal end of the assembly through a different transmission line system than that on which the excitation signals were transmitted.

The present disclosure makes reference to negative going transmit excitation signals, typically pulses, primarily because that is the usual case for non-destructive testing applications. However, it should be understood that complementary and consistent system designs based on the concepts in this invention are possible, if the convention of a positive polarity or bipolar excitation signal is established. Polarities and other related features of the underlying components can be selected to make these analogous situations practicable. Therefore, no limitation of the invention based upon positive, negative or bipolar excitation polarities are implied in any of the discussion contained in this disclosure.

The invention disclosed herein is equally applicable to other common ultrasound testing configurations, including arrangements where two or more approximately equivalent piezoelectric assemblies are used, where a combination of one or more elements are used to produce the acoustic signal and a combination of one or more elements acts as a receiver. This configuration, although more complex in layout, operates on essentially the same transmit-receive basis as the single piezoelectric element configuration.

Keeping in mind the above disclosure with regard to FIG. 2, shown in FIG. 3b is a system 80 which comprises a piezoelectric element, shown by the PIEZO symbol, which is connected between assembly ground return and the non-inverting input of the differential preamplifier. The differential preamplifier is formed from amplifier circuit, U1 and resistances RIN, R3, R4, and R5. The preamplifier provides two complementary differential output signals which are coupled into the distal ends of two controlled impedance transmission lines, W2 and W3, through two resistances R6 and R7 respectively. While the received signals may still be conveyed from the distal to proximal ends by a single unbalanced transmission line, differential signaling techniques allow for improved transmission quality and reduced noise susceptibility. As can be understood from the teaching of the foregoing disclosure, the preamplifier signals can also be carried from the preamplifier to the receiver on a balanced transmission line, or on a fiber optic transmission line without departing from the scope of the present invention. There also exists the possibility of wireless signal transmission as the interconnection between the output of the preamplifier and the receiver.

The reverse-parallel connected diode pair D3 is provided as an amplitude limiter, or clamp, on the input to amplifier U1 to protect against the high voltages that are present during or immediately following excitation signals. Resistor RIN limits the current through diode pair D3 during excitation signals and can be adjusted to provide a share of the impedance matching for the excitation signal transmission line. The apparent impedance for the excitation signal is approximately resistor RIN in parallel with the piezoelectric element impedance. When the piezoelectric element is acting as a receiver, the small signals generated do not cause the diode pair D3 to conduct and therefore resistor RIN does not introduce significant reception losses. The input impedance for the small received signals is the preamplifier input impedance, which can be made relatively high.

The preamplifier circuit obtains operating power via one of more dedicated conductors in the Cable Bundle. Although FIG. 3b shows a "PreAmp Positive Supply" and a "PreAmp Negative Supply", it should be understood that circuit power could be conveyed on only one conductor if suitable power conversion provisions were made at the distal end of the circuit, or alternately, if a "floating" amplifier input circuit configuration were adopted. For the purposes of the current discussion, it will be assumed that the preamplifier operates from both positive and negative polarity supplies.

The active terminal on the piezoelectric element is further connected through the diode D2 at the distal end of a transmission line W1. Transmission line W1 is typically a coaxial line, but may also be implemented as other controlled impedance geometries. A DC bias voltage is applied to diode D2 from the proximal end of the transmission line W1 through resistor R1 to force the diode into a strong reverse bias condition between excitation signals delivered through W1 from the proximal end of the system. The bias voltage on diode D2 is sufficiently high to cause diode D2 to have a very low junction capacitance and a very low leakage even in the presence of small amplitude received signals. As a result of this bias, during the period between excitation signals the transmission line W1 is effectively disconnected from the distal end of the circuit and the entire received signal generated by the piezoelectric element is available to the preamplifier.

The discrete conductors, transmission lines, shielding materials and other supporting conduits between the proximal and distal ends of the assembly are collected together in a cable bundle which has a suitable length, L (see FIG. 2), for the intended application. Typically, the length between the distal and proximal ends of the assembly and the high frequency components in the signals of interest cause the signal return potential at the distal end of the assembly to have a different instantaneous value than the ground at the proximal end of the assembly. The different local ground references for the proximal and distal ends of the assembly are thus indicated with different symbols.

The power supplies U3 and U4 of system 80 shown in FIG. 3b, are selected to be consistent with the power requirements of the preamplifier and amplifier circuits. Supply U3 generates +RCVR power which when delivered to the distal end becomes the "PreAmp Positive Supply". Supply U4 generates −RCVR power which when delivered to the distal end becomes the "PreAmp Negative Supply".

The proximal end of the assembly contains a differential receiver circuit formed from amplifier U2 and resistors R9, R10, R11 and R12. This receiver circuit reconstructs the unbalanced signal of interest from the differential signals and removes any unwanted common mode effects and common mode noise that may have been introduced to the signals. Two resistors RZ1 and RZ2 provide shunt termination for the two transmission lines W2 and W3 respectively. This receiver circuit can also be configured to provide gain by selecting appropriate values for the various feedback resistors.

Resistors R8 and ROUT and three series connected reverse-parallel diode pairs D4, D5 and D6 form an amplifier output protection circuit. High voltages applied by the excitation generator in the ultrasound system are clamped at the common point of R8 and ROUT to a level that will not damage the amplifier U2. The resistance of ROUT is sufficiently high so as to not unduly load the active portion of the excitation signal but is also low enough to provide some damping for the excitation signal once the primary energy delivery period is complete. The three diode pairs also present a cumulative forward and reverse voltage drop high enough to prevent signal shunting when the received signal is at an amplitude in the range of interest.

Excitation signals are conveyed into line W1 through diode D1 and capacitor C1. Diode D1 is provided with a bias voltage similar to that of diode D2 and for similar reasons, but in this case the bias is negative. Capacitor C1 blocks the interaction of the positive and negative DC bias voltages provided to diodes D2 and D1 respectively. During the inter excitation signal period, diode D1 effectively isolates the proximal end of line W1 from the receiver output circuit and the input of the ultrasound system connected via connector P1.

In this fashion, the distal preamplifier and proximal receiver are the primary returning signal path from the piezoelectric element to the ultrasound system, since both ends of the excitation signal path are effectively isolated except during excitation. Conversely, during excitation, the proximal receiver output causes only a small amount of loading of the excitation signal injected into line W1, due to the relatively high output impedance. The net result of this configuration is that large excitation signal amplitudes are preserved for the piezoelectric element, loading effects are controlled on received signals, gain is applied early in the received signal path, noise introduced in the long returning cable run is suppressed and the overall SNR is enhanced.

Figure 4:
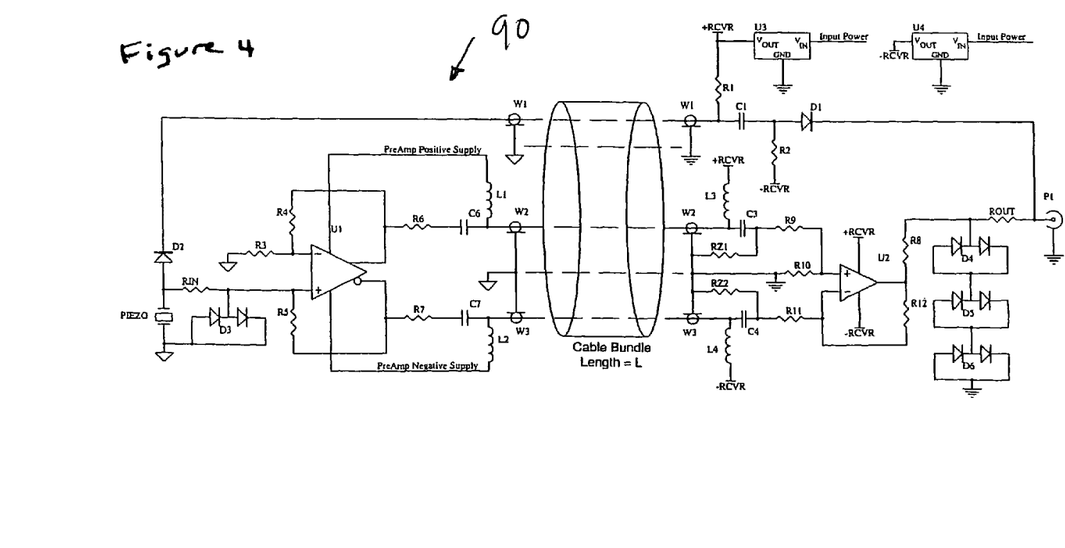
FIG. 4 shows a system embodying the principles of the invention wherein the distal preamplifier and associated elements are connected by several coaxial transmission lines and power is provided as a bias voltage on the return signal leads.

FIG. 4 shows another possible configuration 90 that incorporates DC pass-block circuits to couple the positive and negative power supplies into and out of the differential signal conductors running between the preamplifier and receiver circuits. This technique provides for fewer conductors in the cable bundle since the dedicated power conductors can be omitted. For instance, the combination of inductor L3 and capacitor C3 allow the +RCVR DC power onto the transmission line W2, without influencing the transmission line's ability to carry high frequency signals to the receiver. On the distal end, the inductor L1 and capacitor C6 provide a means to extract the power while still allowing the preamplifier to effectively drive signals onto the transmission lines. The inductors L1 and L3 present high impedances at the frequencies associated with the received signal components but introduce negligible resistance into the DC path. On the same line, the capacitors C3 and C6 allow AC signals to pass freely, but prevent the DC bias on the transmission line W2 from affecting the output of the preamplifier or saturating the input of the receiver. A similar circuit treatment for the complementary signal line using inductors L2 and L4 in conjunction with capacitors C7 and C4 respectively, allow the negative −RCVR power to couple to the distal end of the assembly on the transmission line W3.

Other circuit features and components shown in FIG. 4 operate in a similar fashion to their twins in FIG. 3. Input clamping, amplifier feedback, diode bias and transmission line termination are equivalent.

Figure 5:
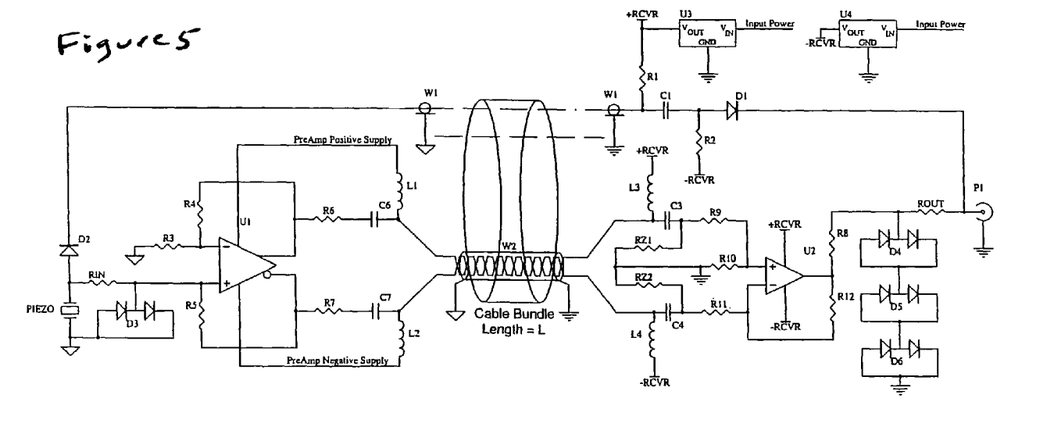
FIG. 5 shows a system embodying the principles of the invention wherein the distal preamplifier and associated elements are connected by both a coaxial and a twin-axial transmission line and power is provided as a bias voltage on the return signal leads.

Although FIGS. 3 and 4 show the two transmission lines, W2 and W3, as individual coaxial constructions, it should be understood that these lines could implemented alternately as:

a twin-axial construction, with a transmission line, W2, similar to a conventional coaxial line except the center conductor is replaced by a twisted pair as shown in FIG. 5. In twin-axial constructions, the impedance is controlled between the centre differential signals lines and between the paired central conductors and the outer conductor; or as a shielded differential pair transmission line, W2, as shown in FIG. 5, but with a controlled impedance only between the paired conductors but not to the outer conductor; or as two twisted pairs, W2 and W3, as shown in FIG. 6, but with each pair utilizing one conductor to convey one sense of the differential signal with the remaining conductor of the pair being used as a ground bond between the proximal and distal ends of the assembly; or other similar controlled impedance cable structures.

Figure 7:
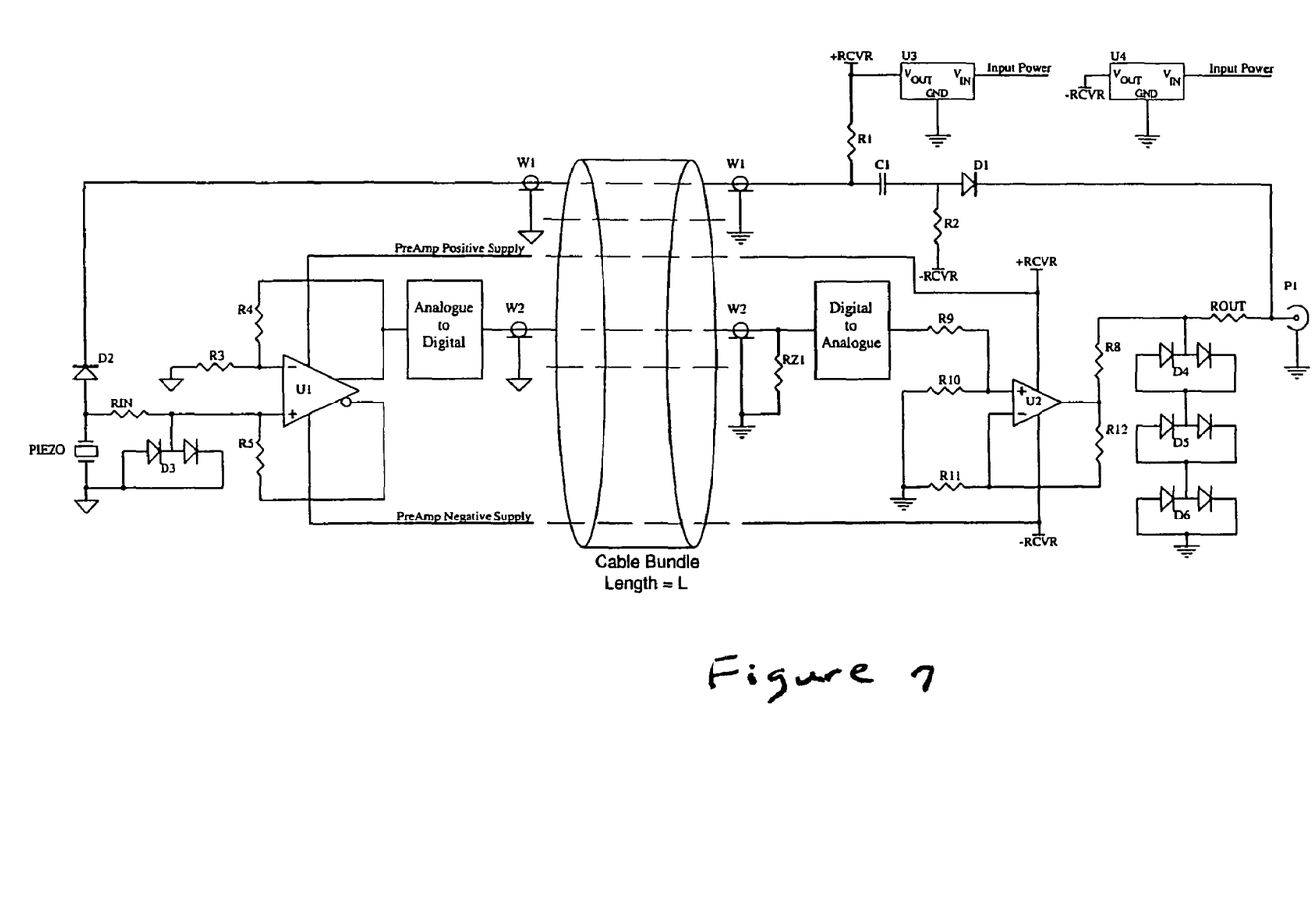
FIG. 7 shows a system embodying the principles of the invention wherein the distal preamplifier and associated elements are connected to the receiver using intermediate digital conversion and reconstruction steps.

Referring to FIG. 7, the simple transmission line and power connections in FIG. 3b have been configured to support appropriate digital interfaces on either end. In this particular implementation, the preamplifier direct output is digitized and the data is conveyed on a single transmission line to the receiver end. At the receiver, the digital data is reconstructed into an analogue signal and sent through the remaining receiver circuitry in a fashion similar to that discussed for FIG. 3b. However, other arrangements using both the direct and complementary outputs of the preamplifier are possible and there are other interconnection schemes to convey the digital data between the respective ends of the assembly.

Still referring to FIG. 7, it is noted that line W2 which carries output signals from the preamplifier to the receiver can be a fiber optic transmission line. In this case, resistor RZ1 can be omitted. Also, in this case, the unit converting analogue to Digital will be replaced by a unit which converts analog to optical, and the unit which converts Digital to Analogue will be replaced by a unit which converts optical to analogue. Also, without departing from the scope of the present invention, an additional unit can be included in FIG. 7 which converts from digital to optical, and yet a further unit can be included which will convert optical back to digital whereby the units shown in FIG. 7 (Analogue to Digital; and Digital to Analogue) can still be used with the fiber optic line.

Figure 6:
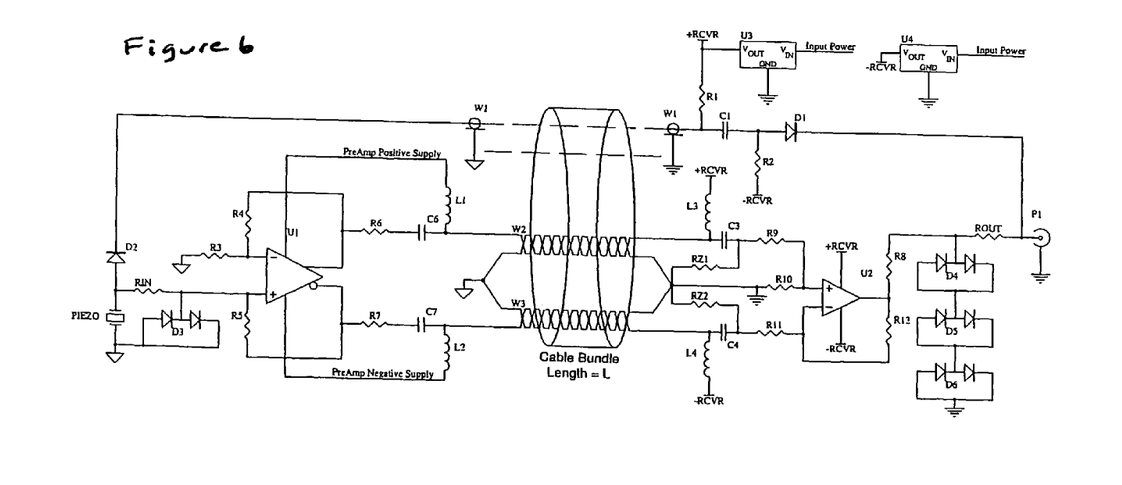
FIG. 6 shows a system embodying the principles of the invention wherein the distal preamplifier and associated elements are connected by a coaxial and two twisted pair transmission lines and power is provided as a bias voltage on the return signal leads.

Another implementation of the principles of the present invention can utilize a fibre optic element as the transmission line as element W2 as shown in FIG. 6. The implementation shown in FIG. 6 is illustrative and does not imply a limitation to the invention.

Figure 8:
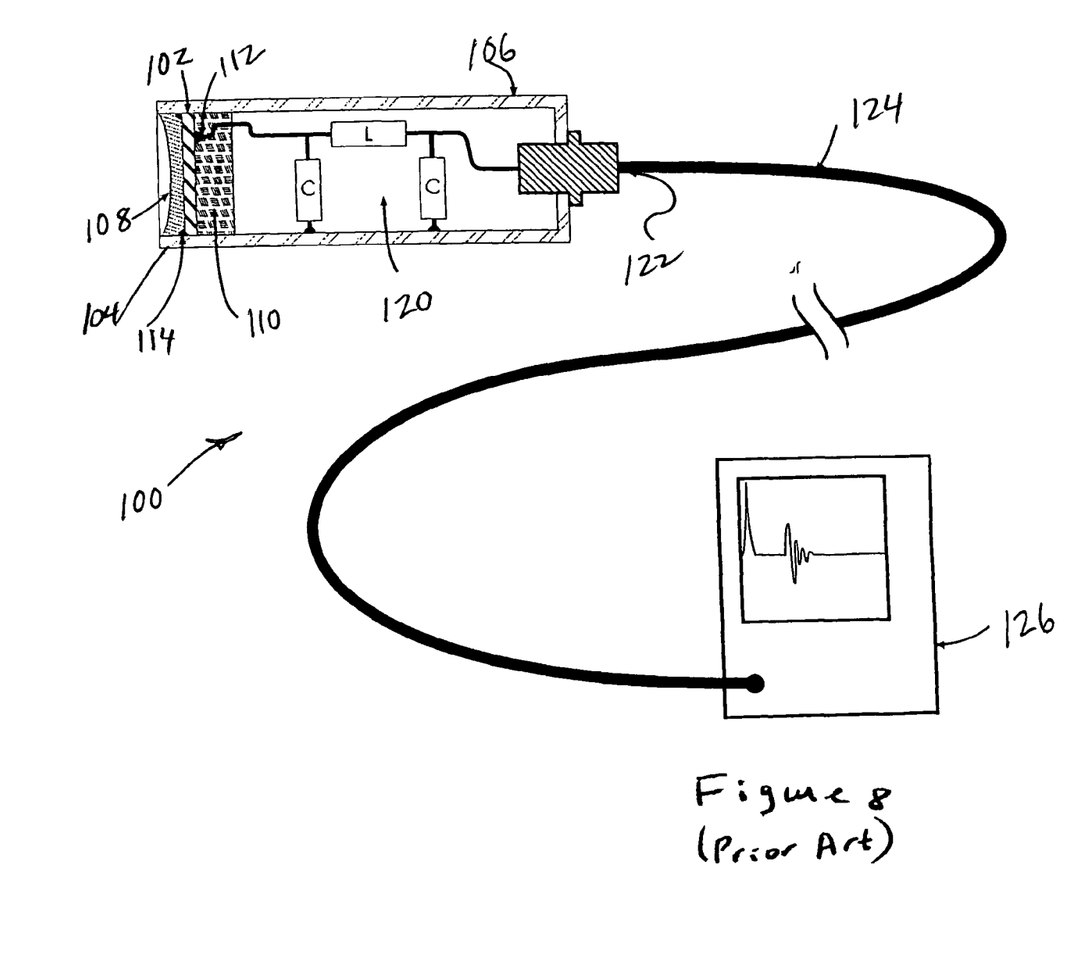
FIG. 8 shows a schematic cross section of a prior art single piezoelectric element cylindrical NDT UT.

Shown in FIG. 8 is a conventional NDT ultrasound system configuration 100. This representation shows piezoelectric material 102 mounted in end 104 of a metal tube 106 with the radiating face of the piezoelectric material facing out the end of the tube and being located adjacent to an acoustic lens 108. Acoustic backing 110 is also located adjacent to the piezoelectric material Electrical connections to electrodes 112 and 114 on the piezoelectric material are arranged so that the inside, or back side, of the material is attached to transmission line matching or tuning network 120. In this example, the impedance matching or tuning is provided by a traditional δ-network which is in turn connected to a coaxial connector 122. A coaxial cable 124 connects the transducer to ultrasound system 126.

Figure 9:
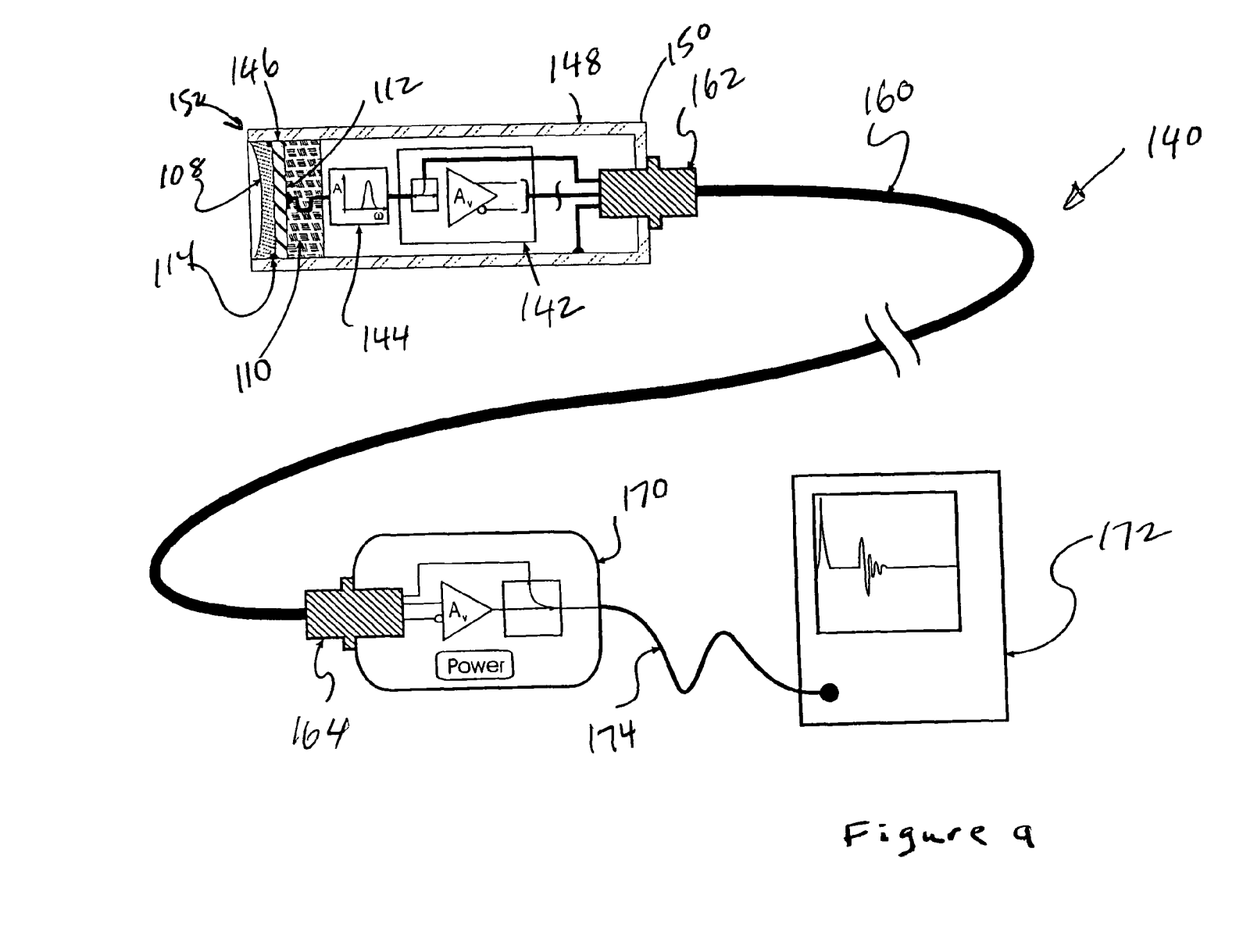
FIG. 9 shows a schematic cross section of the preamplifier equipped single piezoelectric element cylindrical transducer assembled with the multi conductor cable harness, receiver and ultrasound system.

The physical implementation of this invention within a complete NDT solution is shown conceptually as system 140 in FIG. 9. In system 140, preamplifier assembly 142, steering circuit 144 and piezoelectric element 146 are housed in a small, cylindrical package 148 which can be similar to that used to house conventional transducers. At rear end 150 of the cylindrical package (opposite from acoustic radiating face 152) cable bundle 160 connects via a suitable connector 162 and traverses the distance back to the receiver end. A suitable connector 164 couples cable 160 to receiver assembly 170 which is located adjacent to an ultrasound system, such as conventional ultrasound system 172 so that a short interconnection cable 174 can provide the final connection to convey the signal to the ultrasound system in the normal fashion.

While various embodiments of the invention have been described, it will be apparent to those of ordinary skill in the art that many more embodiments and implementations are possible within the scope of this invention. Accordingly, the invention is not to be restricted except in light of the attached claims and their equivalents.

What is claimed is:

1. An ultrasound transducer that is adapted to be connected to an ultrasound system, the transducer comprising:
   a piezoelectric sensor element that is associated with an ultrasound system and which is adapted to process ultrasound signals and which has characteristic wavelengths of a signal generated thereby;
   a preamplifier located near the piezoelectric sensor element and which is connected to the piezoelectric sensor element to receive a signal from the piezoelectric sensor element, the distance between the preamplifier and the piezoelectric sensor element being short compared to the characteristic wavelengths of the signal received by the preamplifier from the piezoelectric sensor element;
   a receiver that receives a signal from the preamplifier and generates a signal suitable for transmission to the ultrasound system;
   power supply circuitry;
   signal routing circuitry that preferentially directs excitation energy from the ultrasound system to the piezoelectric sensor element, received signal energy from the piezoelectric sensor element to the preamplifier, and amplified signal energy from the receiving amplifier to the ultrasound system.

2. The ultrasound transducer defined in claim 1, wherein the preamplifier generates output signals having characteristic wavelengths, and further including conductors between the preamplifier and the receiver, wherein the conductors are shorter than the characteristic wavelengths of the preamplifier output signals.

3. An ultrasound transducer that is adapted to be connected to an ultrasound system, the transducer comprising: a receiver
   a piezoelectric sensor element that is adapted to process ultrasound signals and which has characteristic wavelengths of a signal generated thereby;
   a preamplifier located near the piezoelectric sensor element and which is connected to the piezoelectric sensor element to receive a signal from the piezoelectric sensor element, wherein the preamplifier generates output signals having characteristic wavelengths, and further including conductors between the preamplifier and the receiver, wherein the conductors are at least equal to the characteristic wavelengths of the preamplifier output signals.

4. The ultrasound transducer defined in claim 1, wherein the signal routing circuits are configured to substantially disconnect the excitation signal lines during the received signal period thereby allowing the maximum amount of received signal energy to be provided to the preamplifier.

5. The ultrasound transducer defined in claim 1, wherein the signal routing circuits are adapted to be configured to allow impedance matching of the excitation pulse to the piezoelectric element independent of the impedance matching and frequency filtering components provided to couple received signals into the preamplifier.

6. The ultrasound transducer defined in claim 1, wherein the preamplifier output signals are carried from the preamplifier to the receiver on an unbalanced transmission line.

7. The ultrasound transducer defined in claim 1, wherein the preamplifier differential output signals are carried from the preamplifier to the receiver on a pair of unbalanced transmission lines operating with complementary signals on the active conductors.

8. The ultrasound transducer defined in claim 1, wherein the preamplifier differential output signals are carried from the preamplifier to the receiver on a balanced transmission line.

9. The ultrasound transducer defined in claim 1, wherein the preamplifier output signals are carried from the preamplifier to the receiver using a fibre optic transmission line.

10. The ultrasound transducer defined in claim 1, further including means for immediately converting the preamplifier output signal to a digital format for transmission to the receiver using analogue-to-digital conversion and signaling techniques and digital interconnections, and further including means for converting the digital signals back to the analog domain upon reception at the receiver using digital-to-analogue conversion and signaling techniques to produce an analogue signal at the receiver that is representative of the signal originally received by the preamplifier.

11. The ultrasound transducer defined in claim 10, wherein the received signal transmission interconnections between the preamplifier and receiver are balanced transmission lines.

12. The ultrasound transducer defined in claim 10, wherein the received signal transmission interconnections between the preamplifier and receiver are fibre optic lines.

13. The ultrasound transducer defined in claim 10, wherein the received signal transmission interconnections between the preamplifier and receiver are unbalanced transmission lines.

14. The ultrasound transducer defined in claim 1, wherein the piezoelectric element, the preamplifier and the signal routing circuitry associated with the piezoelectric element and the preamplifier are housed in a unified package.

15. The ultrasound transducer defined in claim 1, wherein the preamplifier, signal routing circuitry, piezoelectric element, and receiver are housed in a unified package.

16. The ultrasound transducer defined in claim 1, wherein supply power and supplementary control signals are simultaneously conveyed over the excitation and received signal lines using direct current pass-through and blocking elements.

17. The ultrasound transducer defined in claim 1, wherein the preamplifier element includes frequency filtering and impedance matching elements in the output circuit to modify the frequency transmission characteristics of the return signal path to enhance the relative signal strength of the desired return signal compared to noise and out-of-band spurious signals.

18. The ultrasound transducer defined in claim 1, wherein the signals received at the receiver are converted to an unbalanced form for application to a conventional ultrasound data acquisition or measurement system.

19. The ultrasound transducer defined in claim 7, wherein the signals received at the receiver are converted to an unbalanced form for application to a conventional ultrasound data acquisition or measurement system.

20. The ultrasound transducer defined in claim 8, wherein the signals received at the receiver are converted to an unbalanced form for application to a conventional ultrasound data acquisition or measurement system.

21. The ultrasound transducer defined in claim 9, wherein the signals received at the receiver are converted to an unbalanced form for application to a conventional ultrasound data acquisition or measurement system.

22. The ultrasound transducer defined in claim 1, further including means for immediately converting the preamplifier output signal to a digital format for transmission to the ultrasound system using analogue-to-digital conversion and signaling techniques and digital interconnections, and means at the ultrasound system for collecting, analyzing and displaying the signals in digital format whereby an intermediate step of conversion back into the analogue signal domain can be omitted.

* * * * *